May 20, 1930.    R. SARAZIN    1,759,373
ARC WELDING
Filed Dec. 7, 1927    3 Sheets-Sheet 2
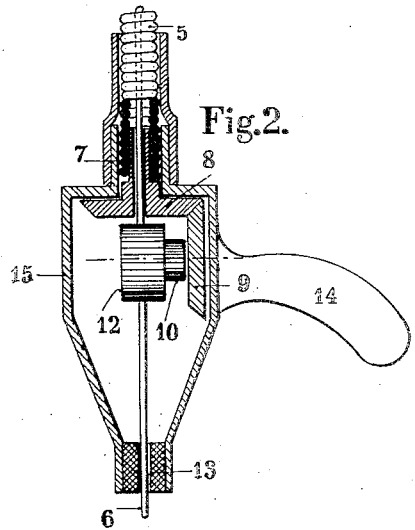
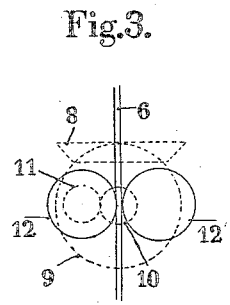
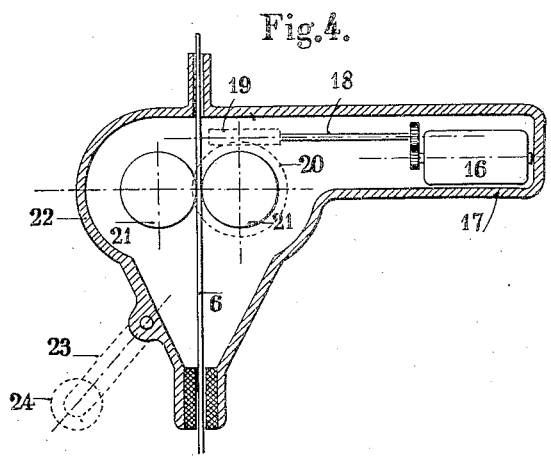

May 20, 1930. R. SARAZIN 1,759,373
ARC WELDING
Filed Dec. 7, 1927 3 Sheets-Sheet 1
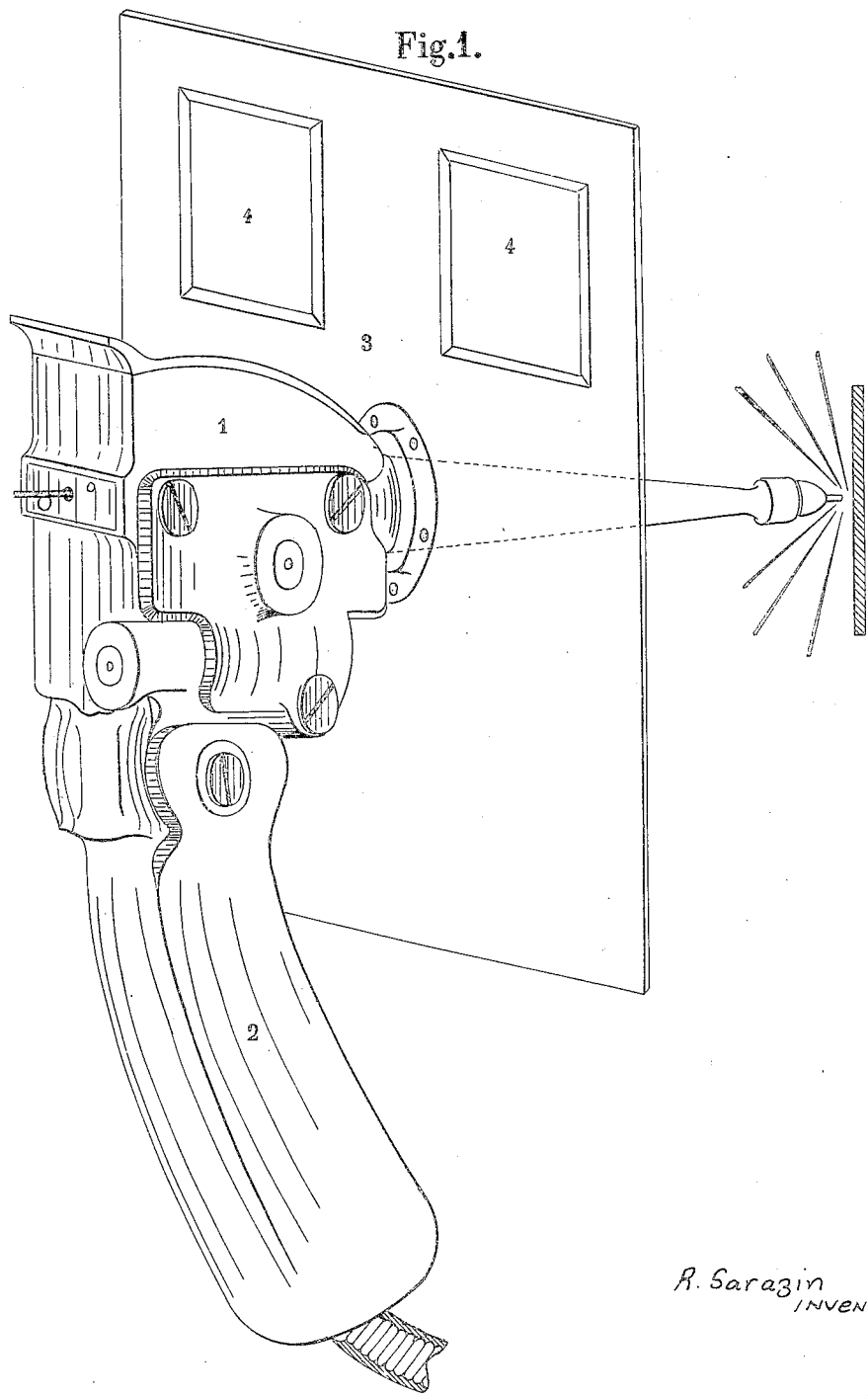

May 20, 1930.  R. SARAZIN  1,759,373
ARC WELDING
Filed Dec. 7, 1927  3 Sheets-Sheet 3

Patented May 20, 1930

1,759,373

UNITED STATES PATENT OFFICE

ROBERT SARAZIN, OF NEUILLY-SUR-SEINE, FRANCE

ARC WELDING

Application filed December 7, 1927, Serial No. 238,443, and in France May 13, 1926.

The invention relates to the process of arc welding currently used in the industry for the joining of metal parts.

In the process, use is made of a wire, called "electrode", which melts in the arc by producing the deposit of metal necessary for the welding operation.

This wire is directed by the operator towards the part to be welded by means of an electrode-holder. This wire can be in the shape of small sticks which are replaced in proportion as they are consumed, or in the shape of a special wire which unwinds in a continuous manner owing to the action of a driving apparatus, called semi-automatic apparatus.

The apparatus can also be of the purely automatic type excluding the use of a welder, but the invention does not concern this particular type and particularly relates to the manual process of welding.

The systems actually used present various inconveniences. First of all, the electrode-holder is held by the operator in his right hand and the welder protects his face and his eyes against the rays of the arc by means of a special screen which he holds in his left hand. The necessity of constantly holding in his hand the said screen is a great drawback for the success of the welding operation; it has already been proposed to cover the head of the operator with a helmet perforated with openings provided with special glasses. However, the wearing of the mask is not without inconvenience for the operator.

Secondly, the known machines, called semi-automatic machines, which insure the continuous unwinding of the electrode-wire, simply act for driving back this wire in a guide, then through a nozzle part of an electrode holder and opposite which the welding arc is produced. In this case, frequent wedgings or jammings of the wire can occur, particularly when the length of wire outside the driving back apparatus exceeds a few meters.

The present invention has for its object a simple contrivance which avoids these multiple inconveniences and owing to which the welding operation can be carried out in a very practical manner, without inconvenience for the operator by leaving to the latter the freedom of his left hand, and by insuring, in all cases, the regular progression of the electrode wire.

The invention resides in the application of the following means, separately or in combination, according to the working conditions:

(a) A fixed or movable screen, perforated with one or more apertures, is mounted on any type of electrode-holder for protecting, not only the face of the operator, but also the hand or hands which hold the said holder;

(b) In case the electrode wire unwinds in a continuous manner, the progression of this wire is secured by a driving device placed on the electrode-holder itself and acting, not by a driving back action, but by traction on the wire;

(c) In the same case, the wire is preferably wound on a reel and can be guided, or not, from this reel to the electrode holder;

(d) The driving device can form an integral part of the apparatus and directly come in engagement with the driving system of the electrode wire, or it can be placed in proximity to the point of operation and, if need be, carried by the operator himself;

(e) The reel from which unwinds the electrode wire is mounted on rail above the operator, or is placed on the back of the latter;

(f) The electrode wire can be cut in sections of suitable length, mounted in the shape of loops above the driving device.

These various means, the partial or total combination of which characterize the invention, have been illustrated in the accompanying drawing in which:

Fig. 1 shows the method of mounting the protecting screen on an electrode-holder.

Fig. 2 illustrates the electrode-holder (the screen being removed) in which the progression of the wire is insured by a flexible transmission.

Fig. 3 is a diagrammatic front view of the parts transmitting the movement shown in Fig. 2.

Fig. 4 is a constructional modification of the electrode-holder, the protecting screen being omitted.

Figure 5:
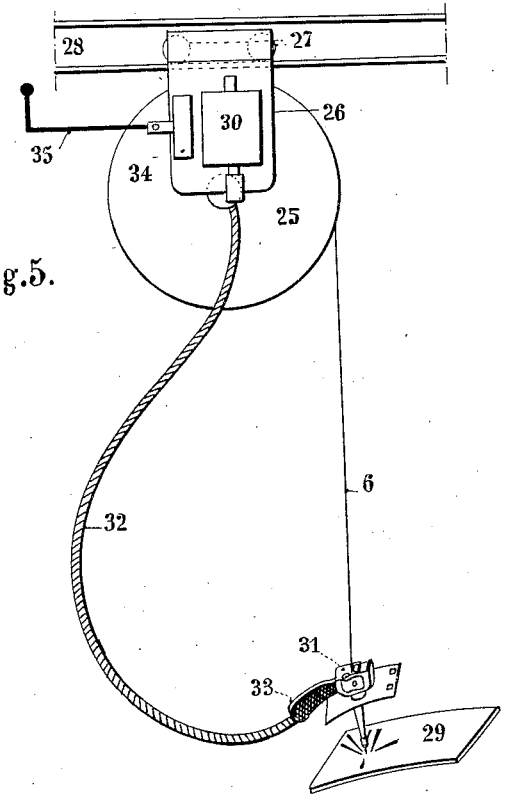
Fig. 5 shows the whole of the arc welding device, with a reel mounted on a rail above the part to be welded.

In accordance with the invention, the electrode-holder of standard type, that is to say using small cut sticks or of the semi-automatic feeding type by a continuous progression of the electrode wire, can be completed by a protecting screen.

In the case of normal holder, the screen can be displaced and guided along the welding stick, so as to follow at every instant the melting of the latter.

In the case of holder of the semi-automatic feeding type, this displacement is not necessary, as the electrode wire is fed to the arc by any mechanical means, the distance between the arc and the member remaining approximately constant. In these conditions, the screen can be permanently secured on the holder, as shown in Fig. 1 of the drawing.

In this figure, the electrode-holder is of one of the types currently used for arc welding, or is of the type hereinafter described. The casing 1 encloses a system for driving the electrode wire, this system being of the type hereinafter described or, more generally, of any suitable nature. The holder is held by the operator by means of the handle 2. The protecting screen 3 is constituted by a rigid panel, made of fibre or of other suitable material. Its dimensions ensure the perfect protection of the operator's face and of the hand holding the holder. At suitable places are formed one or more openings 4 provided with glass or other suitable substance, having the desirable half opacity for allowing the operator to observe his work without being dazzled by the electric arc. It is to be understood that this screen can be removable and that its shape or its arrangement on the holder can form the object of modifications which are all included in the scope of the invention.

A driving device, which can be combined with the screen and electrode-holder, is illustrated in Figs. 2 and 3 of the drawing. This device, particularly favorable for operating at a great distance from the electric welding equipment, can be combined with another system placed near the reel and the function of which will be to drive back the wire into the guide. In Fig. 2 is shown at 5 a flexible transmission the rotation of which is determined by a suitable driving device placed near the reel (not shown) which contains the electrode wire 6. This flexible transmission, within which passes the wire 6, can be advantageously covered with a copper sheath which serves as conductor feeding the current to the arc, the whole being protected by an insulating casing.

The rotation of the flexible transmission is transmitted by a small hollow shaft 7 to a bevel pinion 8 gearing with a bevel pinion 9. The shaft of the latter carries a small spur gear 10 gearing in its turn with a wheel 11 on the axis of which is keyed a driving roller 12. The electrode wire is pulled between this roller 12 and another loose roller 12' arranged opposite the latter. This electrode wire is pushed towards the member to be welded through the nozzle 13.

The motor which determines the rotation of the flexible transmission 5 can be provided with an automatic starting and stopping device controlled by the arc itself; its speed can be a function of the characteristics of the arc for permitting a more or less rapid advance of the wire. Devices ensuring this automatic regulation are particularly described, for the case of entirely automatic machines, in the patent previously filed by the applicant for "automatic machine for arc welding," dated 6th June, 1927, Serial No. 196,880.

The apparatus is completed by a handle 14 held by the operator for directing the welding operation.

The flexible transmission might transmit its movement to the driving rollers by transmission members different from those which have been described, these modifications being, of course, included in the scope of the invention.

It will be often advantageous for portable apparatus to do away with the flexible transmission by placing the driving motor on the casing 15. The motor then drives the rollers through a suitable transmission. In this case, the flexible transmission guiding the electrode can be dispensed with, the electrode being simply pulled through fixed or movable guides, such as rings or rollers suitably pivoted for facilitating the feeding of the wire.

The constructional modification, of Fig. 4 applies this principle and constitutes a very characteristic realization of the invention. The driving motor 16 (which is of a light and reduced type) is placed in the handle 17 or the holder, a speed reducing gear transmits the movement of this motor to a driving shaft 18 terminated by a worm 19 which gears with a small toothed wheel 20. The axis of the latter carries a roller 21 feeding the electrode wire 6 by the combined action of a second roller 21', the whole being enclosed within a casing 22 forming an extension of the hollow handle 17.

The motor can be placed at the front or at the rear, according to the balancing of the apparatus.

It might be of interest to separate the driving device from the feeding device. In this case, the shaft 18 extends in a small flexible shaft receiving its rotation from a motor provided with a speed reducing device and which is placed adjacent to the operator for instance in a bag attached to the belt of the latter, as will be described hereinafter.

It will be useful and easy, in all the cases considered, to provide a device owing to which the motor starts only when there is a demand of electrode wire at the welding point; this device will be constituted for instance by a contactor relay entering in action as soon as the arc is struck.

All these devices can be supported in totality or in part by a series of rollers running on the part to be welded or on an auxiliary rail.

The frame supporting the electrode-holder and provided this roller will be suitably pivoted, so as to permit the arc to be struck.

Fig. 4 shows at 23 a supporting lever provided with rollers 24.

Figure 6:
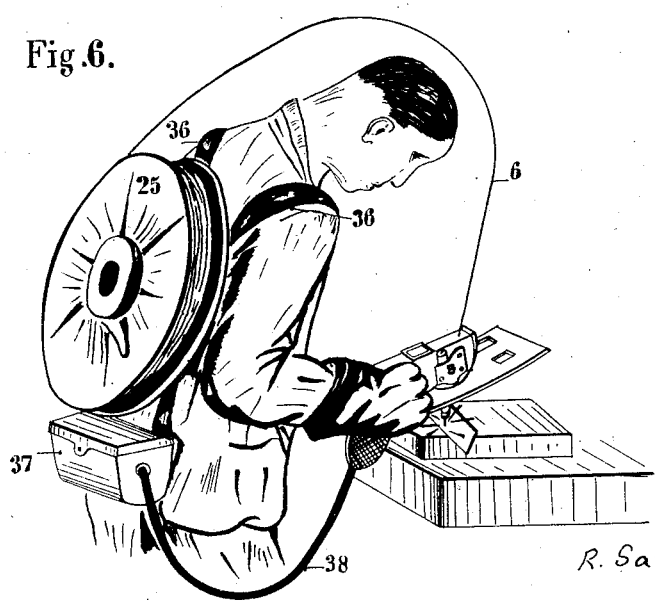
Fig. 6 is a modification of the preceding figure, in which the reel is placed on the back of the operator.

Figs. 5 and 6 illustrate the general arrangements facilitating the feeding of the electrode wire.

In Fig. 5, the electrode wire 6 unwinds from a reel 25 on which it is wound. This reel is carried by the axis of a carriage 26 having a roller 27, owing to which the carriage can move along a rail 28 mounted above the part or member 29 to be welded. On one of the faces of the carriage is secured a motor 30 actuating the feeding device 31 through the medium of a flexible shaft 32. The outer sheath of this flexible shaft is preferably a conducting sheath and it thus feeds the current to the interior of the handle 33 of the electrode carrier up to the wire feeding device; this sheath can also be externally insulated as an ordinary electric cable. A relay 34 is placed in series with the arc, through the current feeding cable 35; as soon as the current passes in the welding circuit, that is to say in the relay, the latter will close an auxiliary circuit which feeds the motor 30. The latter, by starting, determines the rotation of the flexible shaft 32, which comes in engagement with the feeding device carried by the handle 33, held by the operator.

The electrode wire is thus pulled towards the part to be welded and is led towards the arc at a predetermined speed; this speed can be rendered variable by an electric device acting on the motor and controlled at a distance by the operator or by a mechanical unclutching device of the feeding device; this unclutching device is placed on the handle, and the operator can easily actuate it at the necessary moments.

In order to compensate the weight of the feeding device, it might be necessary to brake, through any suitable member the unwinding of the reel 25; the latter then retains the wire in its downward movement and, by reaction, the hand of the operator is freed from the totality or a portion of the weight of the apparatus.

In Fig. 6, the reel 25 and the motor are placed on the back of the operator on a suitable support and are held in place, for instance by means of braces or straps 36. The bag 37 contains a relay and a small motor driving, through the flexible transmission 38, the electrode wire 6 through the holder. The flexible transmission 38 leads the current to the welding arc. In this case, the operator may not use the reel, but sections of wire arranged in the form of loops outside the feeding apparatus.

Finally, in all cases, the weight of the holder can be partially or totally compensated by a suitably arranged counter-poise. The holder can also be provided with a switch which will allow the operator to interrupt the current on the motor and to thus stop the progression of the electrode wire.

Claim:—

A device for arc welding, comprising a reel carrying the electrode wire, a motor arranged near this reel, a flexible shaft actuated by this motor, a hollow shaft driven by the flexible shaft, a bevel gearing driven by the said hollow shaft, a spur gear with which comes in engagement one of the elements of the bevel gearing, a toothed wheel driven by the said spur gear, a set of feeding rollers driven by the said toothed wheel, an electrode wire passing through the flexible shaft and driven by the traction of the said rollers.

The foregoing specification of my "Improvements in the process of arc welding" signed by me this 22nd day of November, 1927.

ROBERT SARAZIN.